United States Patent [19]

Dehn

[11] Patent Number: 4,464,088
[45] Date of Patent: Aug. 7, 1984

[54] DEVICE FOR MAKING HOLES

[75] Inventor: Dieter Dehn, Frankfurt am Main, Fed. Rep. of Germany

[73] Assignee: Stellram GmbH, Heusenstamm, Fed. Rep. of Germany

[21] Appl. No.: 398,633

[22] Filed: Jul. 15, 1982

[30] Foreign Application Priority Data

Feb. 12, 1982 [DE] Fed. Rep. of Germany ....... 3204922

[51] Int. Cl.$^3$ ............................................. B23B 29/03
[52] U.S. Cl. .................................... 408/182; 408/185
[58] Field of Search ............... 408/181, 182, 183, 185, 408/153; 82/2 E, 12

[56] References Cited

U.S. PATENT DOCUMENTS

| 2,811,056 | 10/1957 | Hutto, Jr. | 408/185 |
| 4,006,995 | 2/1977 | Gruner | 408/181 X |
| 4,164,381 | 8/1979 | Lovendahl | 408/181 X |
| 4,405,268 | 9/1983 | Abe | 408/182 |

FOREIGN PATENT DOCUMENTS

| 157329 | 12/1956 | Sweden | 408/185 |
| 572782 | 2/1976 | Switzerland | 408/181 |

Primary Examiner—William R. Briggs
Attorney, Agent, or Firm—Peter K. Kontler

[57] ABSTRACT

A rotary material removing tool wherein an elongated rod supports a carrier for two elongated knife holders between two legs which flank the carrier and can be biased toward each other and against the carrier by a clamping screw extending transversely of the guide groove and at right angles to the axis of the rod. Those surfaces of the holders which abut against each other have elongated shallow recesses which surround the respective ends of the corresponding slots and receive a plate-like intercepting member having a centrally located hole for the shank of the clamping screw. The recesses extend to the inner ends of the respective holders and toward the knives which are mounted at the outer ends of such holders. The legs of the support close the outer ends of the slots, and the intercepting member serves to prevent penetration of chips, shavings and/or other foreign matter into those ends of the slots which are provided in the abutting surfaces of the holders. The extent to which the recesses extend beyond the slots and toward the respective knives equals or exceeds the length of a slot minus the width of such slot, and the length of the intercepting member at least equals the combined length of two slots minus the width of a slot. This ensures that the intercepting member invariably closes such portions of the respective ends of the two slots which are not overlapped by the holders.

10 Claims, 7 Drawing Figures

DEVICE FOR MAKING HOLES

CROSS-REFERENCE TO RELATED CASE

The device which is disclosed in the present application is identical with that which is described and shown in my commonly owned copending application Ser. No. 398,796 filed June 16, 1982 for "ROTARY MATERIAL REMOVING TOOL".

BACKGROUND OF THE INVENTION

The present invention relates to improvements in devices for making holes, and more particularly to improvements in rotary material removing tools of the type wherein a rod-like or an analogous support carries several holders for knives in the form of blades or the like. Still more particularly, the invention relates to improvements in rotary boring, drilling, reaming, milling or analogous tools of the type wherein the front end portion of the rotary support carries two knife holders disposed in a plane which is normal to the axis of the support and wherein the holders are shiftable relative to the support in response to loosening of clamping means which normally prevents any displacements of the holders relative to each other and/or relative to the support.

It is already known to install two knife holders at the front end of an elongated rod-like support which receives torque from the prime mover of a milling, boring or like machine. The holders are adjustable relative to each other and with reference to the support so as to move their knives nearer to or further away from each other, depending on the desired diameter of the hole or bore which is to be machined, enlarged or finished by the tool. The holders have slots for clamping screws which normally secure the holders to the support but allow for adjustment of the holders when the screws are loosened. In accordance with a presently known proposal, the clamping means comprises two screws each of which extends through an elongated slot of the corresponding holder and meshes with the support. The screws are parallel to the axis of rotation of the support and extend through bores in a clamping plate which overlies portions of the holders. The holders are adjacent to one another and are held against movement relative to the support as long as the clamping screws are applied with sufficient force. The aforementioned slots of the holders are only partially overlapped by the clamping plate so that chips, shavings and/or other foreign bodies are likely to penetrate into the slots to thus prevent any adjustments or to interfere with accurate adjustment of holders with reference to the support. Moreover, foreign matter which enters and fills the elongated slots of the holders interferes with removal of shavings or chips from the locations where the cutting edges of the knives remove material from a workpiece or the like.

OBJECTS AND SUMMARY OF THE INVENTION

An object of the invention is to provide a novel and improved rotary material removing device or tool which is constructed and assembled in such a way that its knife holders cannot be obstructed by chips, shavings and/or other foreign matter during the making, enlarging or finishing of holes or bores in metallic or other workpieces.

Another object of the invention is to provide a tool wherein the knife holders can be adjusted within a wide range without the danger of penetration of foreign matter into or between those parts which must remain unobstructed for proper adjustment of the knives with reference to each other and with reference to their support.

A further object of the invention is to provide a tool of the type wherein the clamping means for the tool holders extends with clearance through elongated slots of the holders and wherein such slots are held against penetration of foreign matter in each and every position of adjustment of either holder with reference to its support.

An additional object of the invention is to provide a tool which can be used as a superior substitute for heretofore known tools having adjustable knife holders.

Another object of the invention is to provide a novel and improved device which prevents the penetration of foreign matter into the aforementioned slots of knife holders in a rotary material removing tool.

A further object of the invention is to provide a device which prevents entry of and intercepts foreign matter prior to entering the aforementioned slots and which is sufficiently compact to contribute little or nothing to the bulk and inertia of the rotary tool.

Another object of the invention is to provide novel and improved knife holders for use in a tool of the above outlined character.

The invention is embodied in a material removing tool which comprises a rotary support having a first portion arranged to receive torque from a prime mover and a second portion having a guide groove extending transversely of the axis of the support and two legs which flank the groove, and a pair of elongated knife holders which are movable in and lengthwise of the groove and have elongated slots extending in the longitudinal direction of the groove. The holders have abutting surfaces and the slots have ends in such abutting surfaces of the respective holders. The tool further comprises means for clamping the holders in the guide groove, and such clamping means comprises an elongated member (e.g., a screw) which extends with clearance through the slots of the two holders so that portions of the aforementioned ends of the slots remain exposed, at least in certain positions of adjustment of the two holders relative to each other and with reference to the legs of the support. Still further, the tool comprises intercepting means which is interposed between the two holders and serves to close the exposed portions of the ends of the two slots so as to prevent entry of foreign matter into the slots irrespective of the positions of the two holders relative to one another and/or relative to the legs of the support.

The knives are provided at the outer ends of the holders (such outer ends support the cutting edges of the knives radially outwardly of the outline of the second portion of the support) so that the cutting edges can remove material from a workpiece when the support is driven to rotate about its axis. The intercepting means preferably comprises a substantially plate-like member which is inserted between the abutting surfaces of the holders, and more particularly into recesses which are provided in the abutting surfaces of the holders to receive the plate-like member. The recesses preferably extend all the way to the inner ends of the respective holders and beyond the respective slots toward the outer ends of the respective holders. The extent to which the recesses extend beyond the respective slots and toward the respective knives can equal L minus B wherein L is the length of a slot and B is the width of a slot. The length of the plate-like member can equal or even exceed 2L minus B, and this member has a centrally located hole for the aforementioned elongated member of the clamping means. The plate-like member is guided by edge faces which are provided on the holders to flank the respective slots; such guidance is desirable when the holders are shifted relative to each other and relative to the support in order to move their knives nearer to or further away from one another. The recesses surround the aforementioned ends of the respective slots.

The guide groove is preferably a dovetailed groove having two undercut portions extending lengthwise of the holders. The holders are then provided with elongated portions each of which extends into a different undercut portion of the guide groove so that the holders are held against movement in the axial direction of the support. If desired, the guide groove can be provided in a carrier which can constitute a detachable component of the second part of the support. Such carrier can be held against movement relative to the remainder of the support by the aforementioned elongated member of the clamping means. For example, the legs of the support can be caused to bear against the carrier and to simultaneously urge portions of the carrier against the holders to thereby urge the aforementioned abutting surfaces of the holders against each other.

The novel features which are considered as characteristic of the invention are set forth in particular in the appended claims. The improved tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
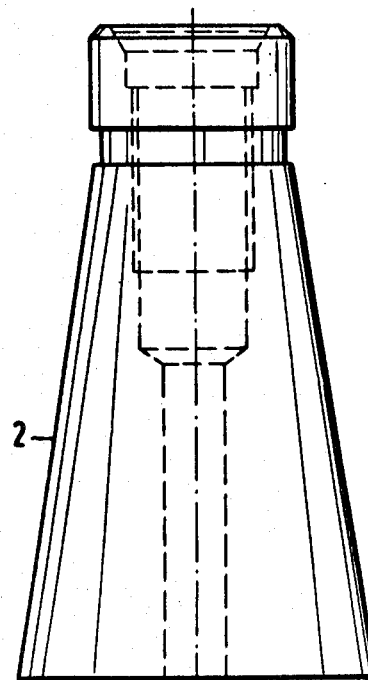
FIG. 1 is an elevational view of a tool which embodies the invention, a portion of the tool being shown in section and the holders for the knives being shown in fully retracted positions.

Referring first to FIG. 1, there is shown a material removing tool which can be utilized to make or finish holes or bores in metallic or other types of workpieces. The tool comprises an elongated rod-like support 1 having a conical rear end portion 2 which can be inserted into the output element of a suitable boring machine, not shown, so that it rotates about the axis 9 of the support when the motor of the machine is in operation. The front end portion of the support 1 is formed with a transverse recess R which is flanked by two legs 3 and 4 disposed at the opposite sides of the axis 9.

The recess R between the legs 3 and 4 accommodates a carrier or clamp 5 having a rear end face which abuts against the bottom surface 6 in the recess R of the support 1. The clamp or carrier 5 extends transversely of the support 1 and at least substantially along the entire length of the recess R between the legs 3 and 4, as considered at right angles to the axis 9. The front end face of the carrier 5 (namely that end face which faces away from the conical rear end portion 2) is formed with an undercut dovetailed guide groove 7 which has two open ends and receives complementary portions 16, 16' of two neighboring knife holders 8, 8' movable in the groove 7 at right angles to the axis 9 of the support 1. As can be readily seen in FIG. 2, the holders 8 and 8' partially overlap each other and the outermost portions of such holders can extend outwardly beyond the outline of the cylindrical intermediate portion of the support 1. The outermost portions of the holders 8 and 8' (as considered at right angles to the axis 9 of the support 1) carry detachable knives in the form of small blades 10 and 10' which are secured thereto by scews 110 (one shown in FIG. 1) or by analogous fasteners. Each of the blades 10 and 10' resembles a small plate and is preferably invertible so that each of its plural cutting edges can be used for removal of material when the improved tool is in use. As can be seen in the lower portion of FIG. 1, the blades 10 and 10' extend radially beyond the outline of the cylindrical portion of the support 1 so that they can penetrate into the material of a workpiece in order to drill or to enlarge a hole or bore to a diameter which is greater than the diameter of the cylindrical portion of the support.

Each of the holders 8 and 8' has an elongated slot 11, 11' which extends in the longitudinal direction thereof, namely, at right angles to the axis 9 of the support 1 and lengthwise of the guide groove 7. FIG. 1 merely shows one of the slots 11, 11' by broken lines, namely, the slot 11 in the left-hand holder 8. Portions of the two slots 11 and 11' are in permanent register with one another as well as with a hole 3a in the leg 3 and with a tappered bore or hole 4a in the leg 4. The hole 3a receives the head 13 and a portion of the shank of an elongated threaded member here shown as a clamping screw 12. The shank of such screw further extends, with clearance, through the registering portions of the slots 11, 11' and into the tapped bore 4a so as to urge the legs 3 and 4 toward each other and to thereby clamp the carrier 5 between the internal surfaces of such legs when the clamping screw is driven home. The diameter of the shank of the clamping screw 12 equals or approximates the width B of the slot 11 or 11'. The length of the slot 11 or 11' equals L (see FIG. 5).

Figure 3:
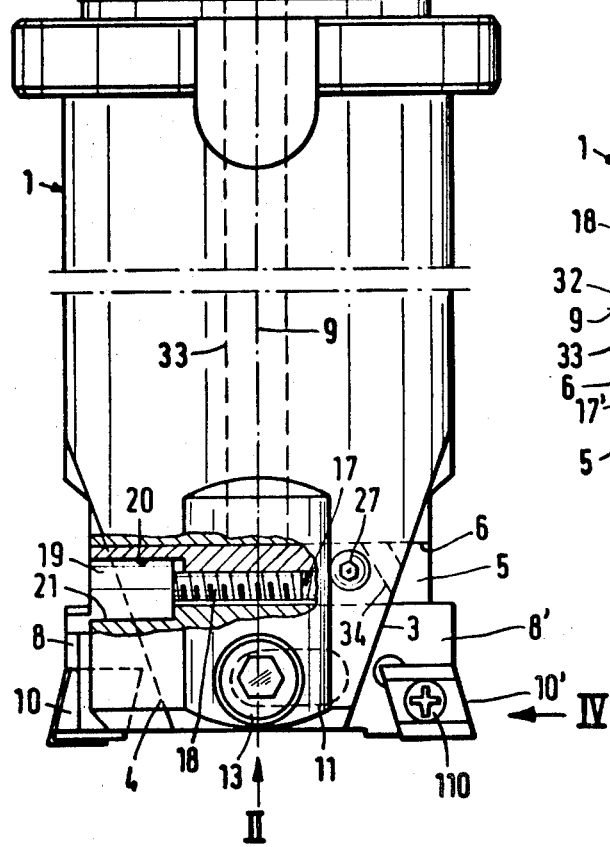
FIG. 3 is an axial sectional view as seen in the direction of arrows from the line III—III in FIG. 2.
Figure 4:
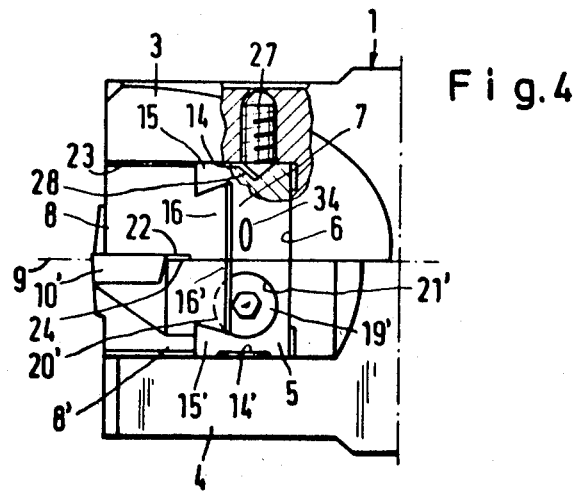
FIG. 4 is an elevational view of the tool as seen in the direction of arrow IV in FIG. 1.

The width of the carrier 5, as considered in a direction from the inner side of the leg 3 toward the inner side of the leg 4, slightly exceeds the combined thickness of the holders 8 and 8'. The difference is in the range of a few micrometers. Furthermore, and as shown in FIG. 3, those sides or lateral surfaces of the carrier 5 which are adjacent to the inner sides of the legs 3 and 4 are formed with relatively shallow but rather wide elongated flexure-enhancing flutes 14 and 14' which are closed by the adjacent inner surfaces of the respective legs 3 and 4. Each of the flutes 14 and 14' extends along the full length of the carrier 5. When the clamping screw 12 is driven home, the legs 3 and 4 exert pressure against the portions 15 and 15' of the carrier 5, namely, against the portions which bound the sides of the dovetailed guide groove 7 in the front end face of the carrier (see particularly FIG. 3). The inner sides of the portions 15 and 15' make an oblique angle with the axis 9 of the support 1, and such inner sides bear against the adjacent complementary surfaces on the aforementioned rear or inner portions 16 and 16' of the respective holders 8 and 8', namely on those portions of the holders which extend into the guide groove 7 (refer again FIG. 3). This ensures that the neighboring surfaces of the holders 8 and 8' are biased against each other. Furthermore, the engagement of portions 15 and 15' on the carrier 5 with portions 16 and 16' on the respective holders 8 and 8' generates a force having a component which is directed toward the rear end portion 2 of the support 1 and acts in parallelism with the axis 9 so as to ensure that the holders 8 and 8' are held without any wobbling when the clamping screw 12 is driven home. The just mentioned component of force which is generated in response to the application of clamping screw 12 causes the rear or inner end faces of the holder portions 16 and 16' to bear against the surface at the bottom of the guide groove 7 in the front end face of the carrier 5. The clamping screw 12 causes some flexing of front portions of the legs 3 and 4 toward each other so that such front end portions of the two legs exert additional retaining force upon the respective (neighboring) holders 8 and 8'. The carrier 5 can be said to constitute a detachable component of the front end portion of the support 1.

Figure 5:
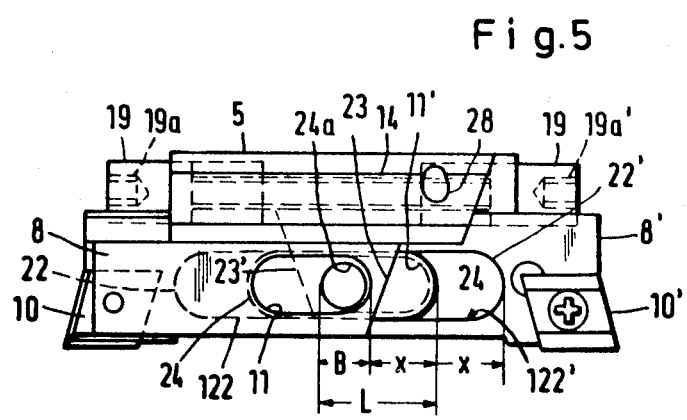
FIG. 5 is an elevational view of a carrier for the knife holders, with the holders shown in fully extended positions.
Figure 6:
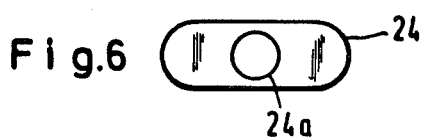
FIG. 6 is a front elevational view of an intercepting member which is used in the structure of FIG. 5.

The carrier 5 is further formed with two tapped bores 17 and 17' which are respectively located behind and are adjacent to portions 16 and 16' of the corresponding holders 8 and 8'. The bores 17 and 17' are parallel to each other and extend at right angles to the axis 9; they respectively receive the shanks of adjusting or shifting screws 18 and 18' having cylindrical heads 19 and 19' (see particularly FIGS. 1 and 5). The holders 8 and 8' are respectively provided with partially cylindrical notches 21, 21' and the carrier 5 is formed with partially cylindrical notches 20 and 20'. The notch 20 complements the notch 21 to form therewith a cylindrical chamber for the head 19 of the shifting screw 18, and the notches 20', 21' cooperate to form a cylindrical chamber for the head 19' of the shifting screw 18'. The notches 20 and 20' have open outer ends so as to permit the respective heads 19 and 19' to emerge from such notches in response to appropriate rotation of the corresponding shifting screws 18 and 18'. On the other hand, the sockets 21 are designed in such a way that the corresponding heads 19 and 19' are not free to move axially therein. Consequently when the screw 18 or 18' is rotated in its tapped bore 17 or 17' which is machined into the rear portion of the carrier 5, the heads 19 and 19' cause the corresponding holders 8, 8' to move transversely of the axis 9 of the support 1, either in a direction to move the two blades 10 and 10' nearer to each other or in the opposite direction. This enables an operator to change the positions of the holders 8 and 8' with reference to each other and to thereby select the diameter of the bore or hole which is to be machined by the cutting edges of the blades 10 and 10' when the machine rotates the support 1. The axial length of the notches 20, 20' and of the heads 19, 19' exceeds the extent of adjustability of the holders 8, 8' relative to the carrier 5. This ensures that the heads 19 and 19' do not extend outwardly from and completely beyond the respective notches 20, 20' even if the holders 8 and 8' are moved to their outermost positions which are illustrated in FIG. 5. Consequently, chips and/or other foreign matter cannot penetrate into the notches 20, 20', and such foreign matter cannot be wedged between the surfaces bounding the notches 20, 20' and the adjacent surfaces of the heads 19, 19'. Foreign matter in such areas could interfere with or prevent accurate adjustment of the holders 8, 8' and the impurities at the outer ends of the heads to 19, 19' could score the surface surrounding a bore or hole which is being drilled by the cutting edges of the blades 10 and 10'. It is to be borne in mind that the heads 19 and 19' rotate about the axis 9 when the improved tool is in actual use; therefore, any foreign matter at the outer ends of the heads 19 and 19' could contact the surface surrounding a freshly drilled bore if the outer ends of such heads were allowed to move radially of the axis 9 and well beyond the outer ends of the corresponding notches 20 and 20'. In order to allow for convenient rotation of the shifting screws 18 and 18', the outer end faces of the head 19, 19' are provided with hexagonal sockets 19a, 19a' (see FIG. 5) or with otherwise configurated (for example, cruciform) sockets which can receive the working ends of suitable torque-transmitting tools, not shown.

Those surfaces of the holders 8 and 8' which abut against each other are formed with relatively shallow elongated recesses 22, 22' which surround the respective ends of the elongated slots 11, 11' and extend beyond such slots, as considered in the radial direction of the support 1 (see particularly FIG. 5). The recesses 22, 22' extend lengthwise of the respective holders 8, 8' and outwardly (toward the respective blades 10 and 10') through distances X (see FIG. 5) each of which equals the length L of the slot 11 or 11' minus the width B of such slot. The value of X can exceed the difference between L and B. The latter further denotes the diameter of the shank of the clamping screw 12. The distance X equals that between a concealed inner edge portion or inner end 23 and 23' of the holder 8 or 8' and the adjacent terminal portion of the corresponding recess 22 or 22'.

The recesses 22, 22' accommodate an elongated plate-like intercepting member 24 which is formed with a centrally disposed hole 24a for the shank of the clamping screw 12. The width of the intercepting member 24 matches the width of the recesses 22, 22' and its thickness equals the combined depth of the recesses 22 and 22'. The length of the intercepting member 24 equals or exceeds L plus X (i.e., 2L minus B) so that this member invariably overlies those portions of the respective ends of the slots 11 and 11' which are not in register with one another, irrespective of the positions of knife holders 8 and 8' with reference to each other, i.e., irrespective of the distance between the blades 10 and 10'. In other words, the intercepting member 24 invariably covers or seals those portions of the slots 11, 11' which are not overlapped by the holders 8, 8' and are not filled by the clamping screw 12. The other ends of the slots 11, 11' are always overlapped by the legs 3, 4 of the support 1. This ensures that chips, shavings and/or other foreign matter cannot penetrate into the slot 11 and/or 11' irrespective of the selected distance between the blades 10 and 10', i.e., irrespective of the selected diameter of the bore which is being formed by the tool. As shown in FIG. 5, the front end of the slot 11' is partially exposed by the holder 8 in the fully extended positions of the holders 8 and 8' so that, in the absence of the intercepting member 24, that portion of the front end of the slot 11' which extends to the right and beyond the inner edge face 23 of the holder 8 would be free to receive shavings, chips or the like. The intercepting member 24 is held in the recesses 22 and 22' because its hole 24a receives a portion of the shank of the clamping screw 12. This member slides along the edge faces 122, 122' in the respective recesses 22, 22' when the holders 8 and 8' are moved relative to each other; however, the extent of its movement relative to the holders 8, 8' or vice versa is not sufficient to permit exposure of the one and/or the other end of the elongated slot 11 or 11' in any of the relative positions of blades 10, 10' with reference to each other.

Figure 2:
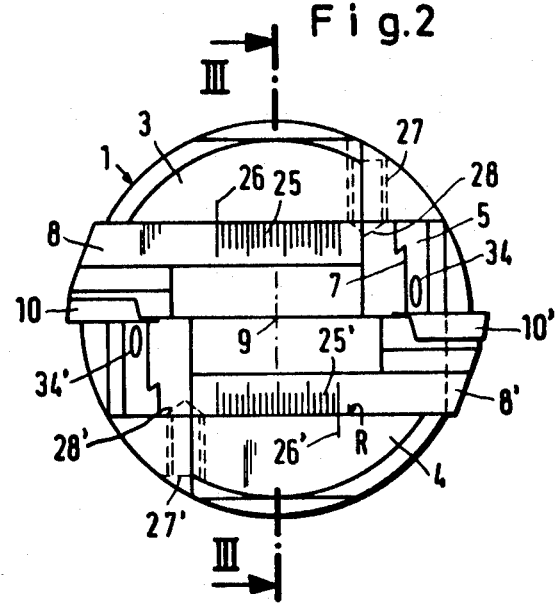
FIG. 2 is a front elevational view of the tool as seen in the direction of arrow II in FIG. 1.

The front end faces of the holders 8 and 8' are respectively provided with graduated scales 25, 25' which are shown in FIG. 2 and cooperate with suitable indices or markers 26, 26' on the front end faces of the legs 3 and 4. This facilitates acccurate selection of the positions of the two holders 8, 8' with reference to each other, namely, the diameter of the hole or bore which is to be drilled or finished by the cutting edges of the blades 10 and 10'. Another function of the scales 25, 25' and of the associated markers 26, 26' is to ensure that the operator can readily adjust the holder 8 to the same extent as the holder 8', or vice versa. The positions of the scales 25, 25' and of the associated markers 26, 26' can be reversed.

The outer sides of the legs 3 and 4 are formed with tapped bores whose axes are normal to and cross in space with the axis 9 of the support 1 (see particularly FIG. 2). The just mentioned bores respectively receive headless grub screws 27, 27' having conical tips which extend into complementary conical sockets 28, 28' of the carrier 5. The axes of the sockets 28, 28' are more distant from the bottom surface 6 in the front end face of the support 1 than the axes of the screws 27, 27' so that, when the screws 27, 27' are driven home, the carrier 5 is urged toward the surface 6 to thus avoid wobbling or vibrations of the carrier relative to the support 1.

Figure 7:
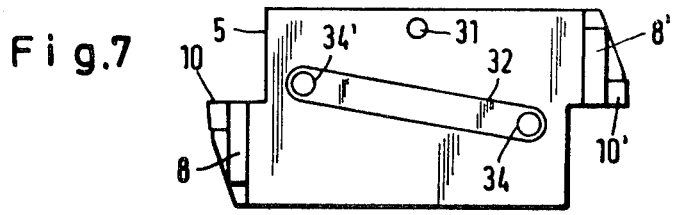
FIG. 7 is a rear elevational view of the structure shown in FIG. 5.

The improved tool further comprises a centering pin 29 which extends into a blind bore 30 in the surface 6 of the support 1 as well as into a bore 31 in the rear end face of the carrier 5 (see particularly FIGS. 3 and 7).

The rear end face of the carrier 5 is formed with a coolant-conveying groove or channel 32 (see FIG. 3 or 7) which communicates with an axially extending coolant-conveying bore or channel 33 in the support 1. The outer ends of the groove 32 (which extends substantially diametrically of the carrier 5 (see FIG. 7) communicate with coolant-conveying channels or passages 24, 24' which are respectively directed toward the adjacent exposed surfaces of the blades 10 and 10'(note FIG. 2). The manner in which the coolant is supplied to the rear end of the channel 33 in the support 1 is not specifically shown in the drawing.

An important advantage of the improved tool is that the intercepting member 24 cooperates with the legs 3, 4 and with the shank of the clamping screw 12 to invariably close both ends of each of the slots 11 and 11' in all positions of the two holders. Thus, chips, shavings and/or other foreign material cannot enter the slots 11, 11' by way of those ends of the slots which are disposed in the region of the intercepting member 24 and/or by way of the other ends which are adjacent to the respective legs of the support 1. As mentioned above, the overall length of the intercepting member 24 at least equals 2L minus B, and the length (X) of those portions of the recesses 22, 22' which extend beyond the respective slots 11, 11' and toward the outer ends of the respective holders 8, 8' equals or exceeds L minus B. The longitudinally extending edge faces 122, 122' in the recesses 22, 22' guide the intercepting member 24 when the holders 8, 8' are in the process of being adjusted relative to one another and with reference to the carrier 5 of the support 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A material removing tool, comprising a rotary support having a first portion arranged to receive torque from a prime mover and a second portion having a guide groove and two legs flanking said groove; a pair of elongated knife holders movable in and lengthwise of said groove substantiallytransversely of the axis of said support and having elongated slots extending in the longitudinal direction thereof, said holders having abutting surfaces and said slots having ends in the respective abutting surfaces; means for clamping said holders in said groove, including an elongated member extending with clearance through said slots so that portions of said ends of said slots remain exposed, at least in certain positions of said holders with reference to each other; and intercepting means interposed between said holders and arranged to close said exposed portions of said ends of said slots.

2. The tool of claim 1, wherein said holders have inner ends and outer ends and further comprising knives provided at the outer ends of said holders, said intercepting means comprising a plate-like member inserted between said abutting surfaces of said holders, said abutting surfaces having recesses receiving said plate-like member.

3. The tool of claim 2, wherein said recesses extend all the way to the inner ends of the respective holders as well as beyond the respective slots in directions toward the respective knives.

4. The tool of claim 3, wherein said recesses extend beyond the respective slots toward the outer ends of the respective holders through distances which at least equal L minus B wherein L is the length and B is the width of a slot.

5. The tool of claim 4, wherein said holders have edge faces bounding the respective recesses and arranged to guide said plate-like member during shifting of said holders with reference to each other.

6. The tool of claim 2, wherein said plate-like member has a centrally located hole for said elongated member of said clamping means.

7. The tool of claim 6, wherein said recesses surround said ends of the respective slots.

8. The tool of claim 6, wherein the length of said plate-like member at least equals 2L minus B wherein L is the length and B is the width of a slot.

9. The tool of claim 1, wherein said groove is a dovetailed groove having two elongated undercut portions and said holders have elongated portions each extending into a different one of said undercut portions.

10. The tool of claim 1, wherein said support comprises a detachable carrier for said holders and said clamping means is arranged to bias said abutting surfaces of said holders against each other through the medium of said carrier.

* * * * *